Patented Nov. 1, 1949

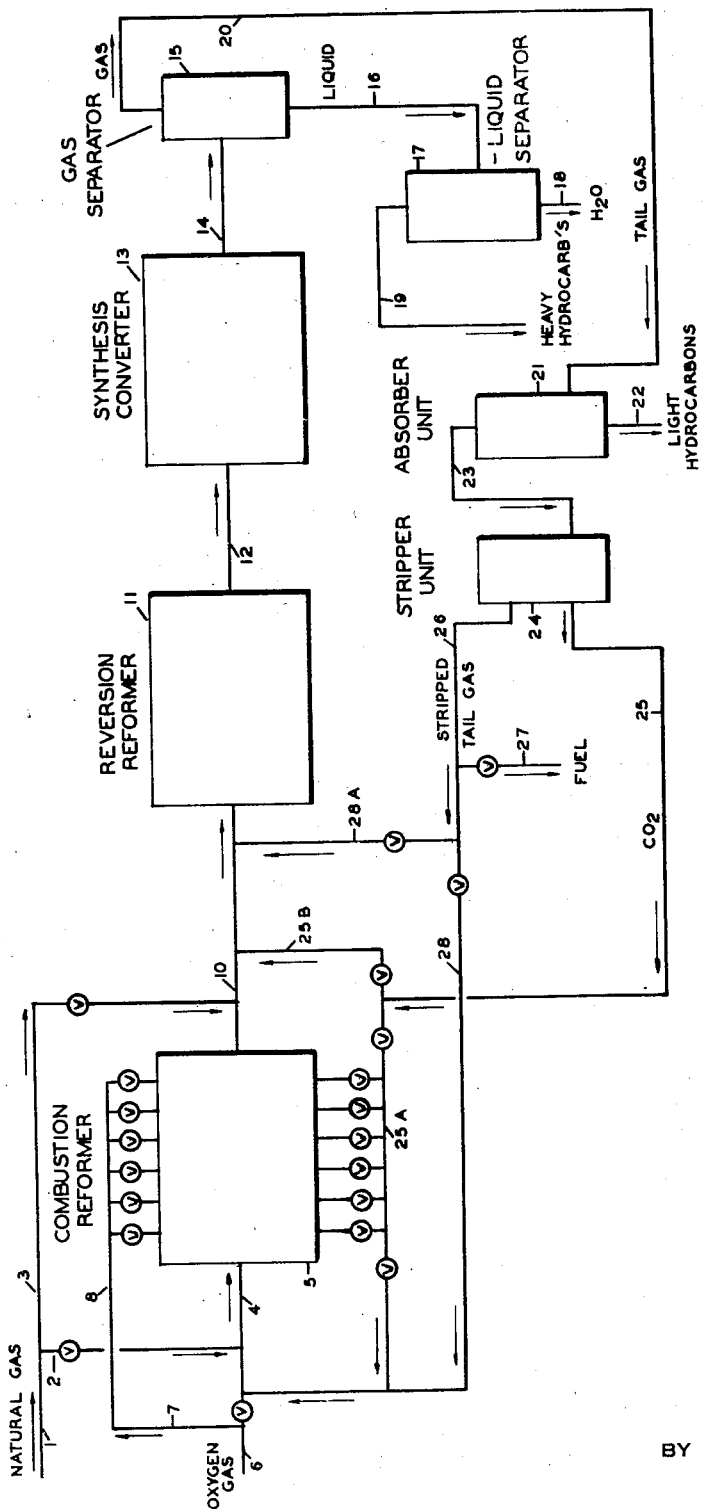

2,486,879

UNITED STATES PATENT OFFICE 2,486,879

MANUFACTURE OF HYDROCARBONS AND THE LIKE

Harry V. Rees, Chappaqua, and Clifford G. Ludeman, Eastchester, N. Y., assignors to Texaco Development Corporation, New York, N. Y., a corporation of Delaware Application March 31, 1945, Serial No. 586,004

9 Claims. (Cl. 260—449.6)

This invention relates to the manufacture of hydrocarbons, oxygenated hydrocarbons and the like by a process involving conversion of low boiling hydrocarbons into carbon monoxide and hydrogen, which latter are in turn converted into products having at least 2 carbon atoms per molecule.

The invention involves reacting a light hydrocarbon such as methane with oxygen and usually in the presence of at least a small amount of added or recycled carbon dioxide to produce gas comprising mainly a mixture of carbon dioxide and steam. This gas is reacted with additional light hydrocarbons under conditions effective to produce synthesis gas comprising mainly carbon monoxide and hydrogen. The resulting synthesis gas is subjected to the action of a synthesis catalyst so as to effect reaction between carbon monoxide and hydrogen to produce the desired synthetic products, including a substantial amount of carbon dioxide. Carbon dioxide so produced is recycled to the light hydrocarbon conversion reactions, as will be described later in more detail.

The gaseous products from the synthesis reaction also include, besides carbon dioxide, other gaseous materials such as unreacted hydrogen and carbon monoxide as well as substantial amounts of nitrogen, the nitrogen entering the system with the oxygen supply. Therefore, in accordance with the invention, provision is made for discharging from the system a substantial portion of the so-called tail gas produced from the synthesis reaction, the amount so discharged being regulated so as to avoid accumulation of nitrogen in the system beyond a predetermined limit. That portion of the tail gas not so discharged is recycled to the light hydrocarbon conversion reactions, as will be described later.

More specifically, the invention contemplates using a normally gaseous hydrocarbon such as methane and splitting the supply of such light hydrocarbon into streams of major and minor proportions, respectively. The stream of minor proportion is passed to a combustion zone to which is also supplied a stream of oxygen or gas rich in free oxygen and carbon dioxide, advantageously recycled from a later stage in the process. Conditions are maintained within the combustion zone so as to effect substantially complete combustion of the light hydrocarbon and to produce a gas consisting essentially of carbon dioxide, steam and such nitrogen as enters the zone with the oxygen. The resulting gas mixture is then passed to a separate or reversion zone to which is supplied the hydrocarbon stream of major proportion. Conditions are maintained within the reversion zone so as to effect reaction between the light hydrocarbons and both carbon dioxide and steam and thus produce a synthesis gas mixture containing carbon monoxide and hydrogen.

The resulting synthesis gas is transferred to a conversion zone wherein it is brought into contact with a suitable catalyst advantageously of the iron type under conditions effective to cause reaction between carbon monoxide and hydrogen for the production of products having at least 2 carbon atoms per molecule.

The products of the synthesis reaction are removed and treated to separate the tail gas from the higher boiling constituents. The tail gas comprises carbon dioxide, unreacted carbon monoxide, some hydrocarbon gases such as methane and ethane, and also hydrogen, as well as nitrogen. Carbon dioxide is stripped from the tail gas and recycled to the combustion zone and, if desired, in part to the reversion zone. It is preferred to recycle to the combustion zone only sufficient carbon dioxide to effect quenching or control of the combustion temperature.

The tail gas from which the carbon dioxide has been stripped is divided into two separate streams, one of which is discharged from the system while the other is recycled to either the combustion or reversion zones or to both. As already stated, the portion of tail gas discharged from the system is regulated so as to avoid accumulation of nitrogen in the system beyond the predetermined limit, which limit is about 20 mol per cent of the synthesis gas stream passing to the synthesis converter.

The reactions in the combustion zone are of an exothermic nature and are effected thermally. Advantageously, conditions are maintained so that the effluent stream from the combustion reformer does not exceed in temperature about 2500 to 3500° F. The reactions in the reversion zone are of an endothermic nature and may be effected with or without the aid of a catalyst, utilizing the sensible heat of the entering gas to maintain the endothermic reactions.

A feature of the invention thus involves effecting the conversion of light hydrocarbons into synthesis gas in two separate zones, utilizing the exothermic heat generated in the one zone to balance or substantially balance the endothermic heat of reaction in the other zone. This is advantageous from the standpoint of temperature control.

Also, a feature of the invention is the use of carbon dioxide recycle so as to avoid the presence of substantial amounts of nitrogen. This reduces the amount of oxygen gas required and also permits lower temperatures in the combustion zone.

A further feature of the invention involves the employment of air enriched in oxygen or oxygen gas of low nitrogen content so as to avoid excessive dilution of the synthesis gas with nitrogen.

Another feature involves using an iron type of catalyst in the synthesis reaction. This type of catalyst is much cheaper than the cobalt type of catalyst. However, it is contemplated that the invention is not limited to the employment of iron type catalysts specifically.

A still further feature of the invention involves carrying out the synthesis reaction under conditions such that a relatively large amount of carbon dioxide is present in the products of reaction.

Heretofore objection has been had to the use of iron catalysts on account of the conversion of a large proportion of the carbon monoxide to carbon dioxide which normally represents a substantial loss of synthesis gas which might otherwise be converted into hydrocarbons or other valuable products. In accordance with the present invention, the carbon dioxide so produced from the synthesis reaction is recycled and ultimately converted into valuable products.

A feature also involved in the process of this invention is that of adjusting the proportion of the total light hydrocarbon feed passed to the combustion zone. The proportion of hydrocarbon feed passed to this zone is maintained such that the total amount of carbon and hydrogen entering the combustion or exothermic zone is substantially the stoichiometric equivalent of oxygen entering that zone for conversion to $CO_2$ and $H_2O$ regardless of the chemical form of the entering carbon, hydrogen and oxygen. Thus, the proportion of light hydrocarbon passing to the exothermic zone may vary from 1 to 50% of the total hydrocarbon feed and is preferably maintained within the range about 5 to 40%.

In order to describe the invention in more detail, reference will now be made to the accompanying drawing. As indicated in the drawing, a stream of natural gas hydrocarbons is conducted from a source not shown through a pipe 1. These hydrocarbons advantageously comprise normally gaseous hydrocarbons having from 1 to 4 carbon atoms per molecule.

This gas stream is split into minor and major proportions, the minor stream passing through a branch pipe 2 while the major stream passes through a pipe 3 to a succeeding stage of the process as will be described.

These streams may pass through suitable heat exchange apparatus or furnaces fired by the vented tail gas to which reference will be made later and not indicated in the drawing, so as to adjust the temperature of each stream to the level desired prior to processing.

The minor stream passing through the pipe 2 flows into a pipe 4 from which it passes to a combustion reformer 5. The reformer 5 can be of any suitable design and is advantageously lined with refractory material capable of withstanding the relatively high temperatures prevailing therein.

A stream of oxygen gas containing from about 50 to 100% oxygen is conducted from a source not shown through a pipe 6 which also communicates with the pipe 4 leading to the reformer 5. If desired, the oxygen may be diverted all or in part through a branch pipe 7 leading to a manifolded pipe 8, provided with a series of branch pipes adapted to introduce the gas to the combustion reforming zone at a plurality of succeeding points in the direction of hydrocarbon flow therethrough, the purpose of this being to facilitate temperature control and aid in maintaining uniformity in combustion conditions. The entering oxygen gas can be preheated by means such as already referred to above. Split stream injection of the hydrocarbon gas and carbon dioxide can be employed.

The effluent stream of resulting combustion gas is conducted from the reformer 5 through a pipe or conduit 10 leading to a reversion reforming unit 11.

Combustion conditions in the reformer 5 are maintained so that the temperature of the gas flowing through the pipe 10 will be in the range about 2500 to 3500° F.

The previously-mentioned major stream of feed hydrocarbon flowing through the pipe 3 is injected into the gas stream flowing through the pipe 10. Split stream injection into the reformer 11 may be employed.

The resulting mixture of hydrocarbons, carbon dioxide and steam is at a temperature sufficiently high to cause reaction between hydrocarbons and carbon dioxide and between hydrocarbons and steam for the production of carbon monoxide and hydrogen.

The temperature conditions prevailing in the reforming unit 11 will range from about 1500 to 2500° F. when the reversion reactions are being carried out without the aid of a catalyst. A catalyst such as nickel-alumina, capable of promoting reaction of $CO_2$ and $H_2O$ with hydrocarbons, may be employed in this stage, in which case the reversion temperatures will range from about 1000 to 2000° F.

The effluent stream of synthesis gas is removed from the reformer 11 through a pipe 12 and after reduction in temperature by heat exchange, not shown, is passed to a synthesis converter 13. This converter may be of the conventional type containing a stationary mass of catalyst comprising about 30% iron, 60% diatomaceous earth or other supporting material and about 10% of promoting substances such as the oxides of thorium or magnesium.

The synthesis reaction is effected at a temperature ranging from about 300 to 600° F. As a result of contact with the catalyst, carbon monoxide and hydrogen react to form hydrocarbons which are mainly normally liquid. Some gaseous hydrocarbons such as methane are formed and a substantial portion of the carbon monoxide is converted to carbon dioxide.

The products of the synthesis reaction are conducted through a pipe 14 to a separator 15 wherein gaseous hydrocarbons, carbon dioxide and unreacted carbon monoxide and hydrogen are continuously separated from the liquid constituents. The synthesis products are cooled before or after introduction to the separator 15 so as to effect condensation of hydrocarbons and steam.

The liquid hydrocarbons and water accumulating in the separator 15 are drawn off through a pipe 16 to a separator 17 wherein separation between heavy hydrocarbons and water occurs. The water is discharged from the system through a pipe 18 while the heavy hydrocarbons are discharged through a pipe 19.

The gaseous fraction separated in the separator 15 is discharged through a pipe 20 and conducted through an absorption unit 21 which may be of conventional type adapted to effect removal of light hydrocarbons such as propane, butane, pentane and heavier from the residual or tail gas. These light hydrocarbons are discharged through a pipe 22.

The residual gas is conducted through a pipe 23 to a stripping unit 24 adapted to effect removal of carbon dioxide from the gas. This unit may be of the absorption type wherein the carbon dioxide is absorbed in a suitable scrubbing liquid.

The recovered carbon dioxide is conducted through a pipe 25 which communicates with a manifolded pipe 25A. The latter is provided with a plurality of branch pipes, as indicated, adapted to introduce the recycled carbon dioxide to the combustion reformer 5 at a plurality of succeeding points between the hydrocarbon feed inlet and the effluent gas outlet.

The stripped tail gas from which carbon dioxide has been removed is conducted through a pipe 26 and a portion thereof is continuously discharged from the system through a branch pipe 27, while the remainder is conducted through a pipe 28 communicating with the pipe 4 leading to the reformer 5. As mentioned later this remainder may be passed through a pipe 28A to the reformer 11.

The several stages of apparatus comprising reforming units, synthesis converter, separators, absorbing unit and stripping unit are illustrated merely in diagrammatic fashion since the apparatus employed in these stages is of conventional type and is not thought to require detailed description.

As previously indicated, carbon dioxide is recycled to the combustion reforming unit 5 to serve as a quenching and oxidizing agent. Thus, the carbon dioxide, after removal from the stripping unit 24, is at a relatively low temperature, about 100 to 150° F. and therefore at a temperature substantially below that prevailing in the combustion reformer. Thus, this recycled gas acts as a cooling agent. It is useful for this purpose because it is inert with respect to the oxygen entering the combustion reformer and therefore does not enter into an exothermic reaction with oxygen.

The remainder of the carbon dioxide is recycled through a branch pipe 25B which communicates with the previously mentioned pipe 10. In this way it is passed to the reversion reformer 11 wherein it enters into reaction with feed hydrocarbons.

The process can be adjusted so as to vary the ratio of hydrogen to carbon monoxide passing to the synthesis converter 13. Assuming that the synthesis converter is operated at a predetermined level of temperature and pressure with a given catalyst, the ratio of hydrogen to carbon monoxide in the gas stream flowing through the pipe 12 may be varied by changing the ratio of enriched air to hydrocarbon gas passing to the hydrocarbon conversion zones 5 and 11. On the other hand, the synthesis reaction conditions may be varied so as to produce a predetermined amount of carbon dioxide in the products of the synthesis reaction.

As already indicated, the employment of an iron type catalyst favors the production of large amounts of carbon dioxide. Likewise, the employment of higher temperatures favors the production of increased amounts of carbon dioxide and also of light hydrocarbons such as methane. In this way the carbon dioxide content of the recycled gas is increased and this in turn will result in increasing the ratio of carbon monoxide to hydrogen flowing through the pipe 12.

It is contemplated that the hydrocarbon conversion into synthesis reactions may be carried out under elevated pressure. For example, these reactions may be carried out under pressures ranging from 20 to 600 pounds per square inch, the pressure decreasing slightly in each succeeding stage so as to permit the flow of reactants through the sequence of operations without resort to the employment of compressors or blowers, etc. between stages, except where necessary to return the recycled streams.

As indicated in the drawing, that portion of the stripped tail gas which is recycled is conducted to the combustion reforming unit 5. The amount so recycled is limited so that the nitrogen content of the synthesis gas flowing through the pipe 12 will not exceed a predetermined limit of about 20 mol per cent nitrogen in the synthesis gas.

The following is an example in which a hydrocarbon gas consisting essentially of methane is charged, a nickel reduction catalyst being used in the reformer 11. The composition of the gas is as follows:

| | Mol per cent |
|---|---|
| $N_2$ | 0.4 |
| $CO_2$ | 0.1 |
| $CH_4$ | 98.3 |
| $C_2H_6$ | 1.2 |

This gas is divided into two streams, a minor stream amounting to 6.29 mol per cent and a major stream amounting to 93.71 mol per cent. This minor stream is passed to the reformer unit 5 at the rate of about 12.32 pounds per hour (272 cubic feet reduced to standard conditions) while the major stream is passed through the pipe 3 to the reversion reformer 11 at the rate of about 183.64 pounds per hour (4047 cubic feet).

The stripped tail gas recycled through pipe 28 to the reformer 5 amounts to about 156.31 pounds per hour (3449 cubic feet). The amount so recycled represents about 42.3 mol per cent of the total stripped tail gas flowing through the pipe 26. In other words, about 57.7 mol per cent of the stripped tail gas is discharged from the system through the pipe 27. The composition of the recycled tail gas is as follows:

| | Mol per cent |
|---|---|
| $H_2$ | 40.6 |
| $N_2$ | 29.4 |
| $CO$ | 14.7 |
| $CO_2$ | 1.4 |
| $H_2O$ | 6.5 |
| $CH_4$ | 6.7 |
| $C_2H_4$ | 0.1 |
| $C_2H_6$ | 0.4 |
| $C_3H_6$ | 0.1 |
| $C_3H_8$ | 0.1 |

The enriched air flowing through the pipe 6 amounts to about 695.08 pounds per hour (3480 cubic feet) and consists of 39.3 mol per cent nitrogen and 60.7 mol per cent oxygen.

The combustion gas leaving the reformer 5 amounts to about 817.10 pounds per hour (9303 cubic feet) and has the following composition:

| | Mol per cent |
|---|---|
| $H_2$ | 0.01 |
| $N_2$ | 25.97 |
| $CO$ | 0.04 |
| $CO_2$ | 41.93 |
| $H_2O$ | 32.05 |

The synthesis gas leaving the reforming unit 11 amounts to about 1000 pounds per hour (21,510 cubic feet) and has the following composition:

| | Mol per cent |
|---|---|
| $H_2$ | 42.5 |
| $N_2$ | 11.3 |
| $O_2$ | 0.1 |
| CO | 33.3 |
| $CO_2$ | 3.8 |
| $H_2O$ | 9.0 |

The combined light and heavy hydrocarbons discharged through the pipes 22 and 19, respectively, amount to about 122 pounds per hour and are composed of about 47.61 pounds gasoline, 31.49 pounds gas oil, and 42.90 pounds of wax.

The water discharged through the pipe 18 amounts to about 155.72 pounds per hour. The tail gas flowing through the pipe 23 amounts to about 721.83 pounds per hour (11,221 cubic feet) and has the following composition:

| | Mol per cent |
|---|---|
| $H_2$ | 29.99 |
| $N_2$ | 21.65 |
| CO | 10.84 |
| $CO_2$ | 25.57 |
| $H_2O$ | 6.46 |
| $CH_4$ | 5.0 |
| $C_2H_4$ | 0.04 |
| $C_2H_6$ | 0.30 |
| $C_3H_6$ | 0.04 |
| $C_3H_8$ | 0.11 |

The recycle carbon dioxide gas flowing through the pipe 25 amounts to about 352.31 pounds per hour (3067 cubic feet) and has the following composition:

| | Mol per cent |
|---|---|
| $H_2$ | 1.7 |
| $N_2$ | 0.9 |
| CO | 0.7 |
| $CO_2$ | 89.8 |
| $H_2O$ | 6.5 |
| $CH_4$ | 0.4 |

By way of another example operating on hydrocarbon gas of similar composition, using the same proportion of oxygen gas, the same proportion of recycle carbon dioxide gas and the same proportion of recycle stripped tail gas as used in the preceding example and each having a composition similar to the corresponding gas of the preceding example, the hydrocarbon gas is divided into a minor stream of 23.6 mol per cent and a major stream of 76.4 mol per cent. Also, instead of returning the 156.31 pounds of recycle stripped tail gas to reformer 5, it is passed through a pipe 28a to the reformer 11, together with the major gas stream of 76.4 mol per cent.

In this case the combustion gas amounts to 694 pounds per hour (7540 C. F.) and has the following composition:

| | Mol per cent |
|---|---|
| $H_2$ | 0.01 |
| $N_2$ | 18.58 |
| CO | 0.02 |
| $CO_2$ | 50.61 |
| $H_2O$ | 30.78 |

The synthesis gas leaving the reformer unit 12 also amounts to about 1000 pounds per hour and is of the same composition as in the preceding example. An advantage in passing all of the recycle stripped tail gas to the reformer unit 11 is that the amount of heat that must be supplied to this unit is reduced.

While split feed of recycled carbon dioxide and of enriched air is illustrated in the drawing, it will be understood that this is optional.

It is also contemplated that the combustion and reversion reactions may be carried out in separate sections of the same vessel or unit.

The separate sections may be packed with refractory or ceramic materials with provision for reversing the direction of flow of reactants through the sections. Thus when the combustion section reaches a relatively high temperature the flow of reactants may be reversed so that what was the reversion section becomes the combustion section, the flow being continued in this sequence until temperature conditions necessitate restoring the preceding sequence of flow. These reversals of flow may be made at frequent intervals so as to substantially balance the heat load. This type of operation also permits periodic removal of accumulated carbon, if any, by combustion.

The process is applicable to the production of oxygenated hydrocarbons or compounds other than aliphatic hydrocarbons. Such oxygenated hydrocarbons may comprise compounds having a single carbon atom per molecule such as methanol, formaldehyde and formic acid.

The combustion and reversion reactions may be carried out in co-axial zones of a single vessel, the combustion occurring in the innermost zone while the reversion occurs in the annular zone to thus utilize heat transferred from the combustion reaction.

While mention is made of recycling $CO_2$ to combustion zone and in part to the reversion zone, the operation may be such that all of the $CO_2$ is recycled to the reversion zone, or may be split in any proportions between the two zones. Likewise, the recycled stripped tail gas may be split in any proportions between units 5 and 11, provided the foregoing stoichiometrical relationships are maintained.

Obviously many modifications and variations of the invention as above set forth may be made without departing from the spirit and scope thereof, and therefore only such limitations should be imposed as are indicated in the appended claims.

We claim:

1. In the manufacture of products containing at least two carbon atoms per molecule involving reaction between carbon monoxide and hydrogen derived from the conversion of normally gaseous hydrocarbons, said conversion being effected in exothermic and endothermic conversion zones, the steps comprising maintaining a supply of hydrocarbon feed gas containing normally gaseous hydrocarbons, splitting said hydrocarbon feed into first and second streams, passing said first stream to an exothermic reaction zone and said second stream to an endothermic reaction zone, passing oxygen-rich gas containing 50 to 100 per cent free oxygen to said exothermic zone, effecting substantially complete combustion of said first stream hydrocarbons within said exothermic zone to form combustion gas comprising mainly $CO_2$ and $H_2O$ at an elevated predetermined temperature substantially above that prevailing in said endothermic reaction zone, passing resulting hot combustion gas to said endothermic reaction zone, effecting substantial reaction therein of second stream hydrocarbons with said $CO_2$ and $H_2O$ to form synthesis gas containing mainly CO and $H_2$, utilizing the exothermic heat energy generated in said exothermic zone to support said last-named reaction by regulating the said elevated temperature of said hot combustion gas supplied to the endothermic reaction zone at a level such that the sensible heat is effective to thermally support reaction in said endothermic reaction zone, passing resulting synthesis gas to a synthesis zone containing a synthesis catalyst comprising iron at a temperature sufficiently elevated to effect substantial conversion of CO into normally gaseous and normally liquid products including $CO_2$ in substantial amount, removing resulting products of the synthesis reaction, recovering $CO_2$ from said products, obtaining from said products a stripped tail gas comprising mainly unreacted CO and $H_2$, recycling a predetermined portion of said stripped tail gas to at least one of said conversion zones discharging non recycled stripped tail gas, recycling a portion of recovered $CO_2$ to the exothermic zone in an amount and at a temperature sufficient to maintain the effluent combustion gas from said exothermic zone at not in excess of said predetermined temperature, and maintaining the proportion of said first stream passing to the exothermic zone such that the total amount of carbon and hydrogen entering the exothermic zone is substantially the stoichiometric equivalent of oxygen entering that zone for conversion to $CO_2$ and $H_2O$ regardless of the chemical form of the entering carbon, hydrogen and oxygen.

2. The method according to claim 1 in which the predetermined reaction temperature in the exothermic zone is in the range of about 2500 to 3500° F.

3. The method according to claim 1 in which the proportion of said first stream constitutes a minor portion of the total hydrocarbon feed gas supplied to the process.

4. The method according to claim 1 in which from about 1 to 50 mol per cent of the hydrocarbon feed gas is charged to the exothermic reaction zone.

5. The method according to claim 1 in which the endothermic reaction is effected in the presence of a nickel catalyst.

6. In the manufacture of products containing at least two carbon atoms per molecule involving reaction between carbon monoxide and hydrogen derived from the conversion of normally gaseous hydrocarbons, the steps comprising maintaining a supply of hydrocarbon feed gas containing normally gaseous hydrocarbons, splitting said hydrocarbon feed into first and second streams, said first stream being relatively smaller than said second stream, passing said first stream to an exothermic conversion reaction zone and said second stream to an endothermic conversion reaction zone, passing relatively pure oxygen to said exothermic zone, effecting substantially complete combustion of said first stream hydrocarbons within said exothermic zone to form combustion gas comprising mainly $CO_2$ and $H_2O$ at an elevated predetermined temperature not exceeding about 3500° F., passing resulting hot combustion gas to said endothermic reaction zone, effecting substantial reaction therein of second stream hydrocarbons with said $CO_2$ and $H_2O$ to form synthesis gas containing mainly CO and $H_2$, utilizing the exothermic heat energy generated in said exothermic zone to support said last-named reaction by regulating said elevated, predetermined temperature of said hot combustion gas supplied to the endothermic reaction zone, at least at about that level at which the sensible heat is effective to thermally support said reaction in the endothermic reaction zone, passing resulting synthesis gas to a synthesis zone containing a synthesis catalyst comprising iron and maintained at about 600° F., effecting substantial conversion of CO into normally gaseous and normally liquid products including $CO_2$ in substantial amount, removing resulting products of the synthesis reaction, separating from said products a tail gas comprising $CO_2$, nitrogen and unreacted CO and $H_2$, stripping $CO_2$ from said tail gas, recycling recovered $CO_2$ in part at least to the exothermic zone in an amount and at a temperature sufficient to maintain the effluent combustion gas from said zone at not in excess of said predetermined temperature, recycling a portion of said stripped tail gas to at least one of said conversion zones, discharging non recycled stripped tail gas, and maintaining the proportion of said first stream passing to the exothermic zone such that the total amount of carbon and hydrogen entering the exothermic zone is substantially the stoichiometric equivalent of oxygen entering that zone regardless of the chemical form of the entering carbon, hydrogen and oxygen.

7. The process according to claim 1 in which stripped tail gas is recycled to the endothermic zone.

8. In the thermally self-supported conversion of normally gaseous hydrocarbons into high yields of hydrogen and carbon monoxide for use as a synthesis gas in the production of hydrocarbons, oxygenated hydrocarbons and mixtures thereof, the steps which comprise maintaining a supply of normally gaseous hydrocarbon feed, splitting said feed gas into first and second streams, the first stream being relatively smaller than the second stream, passing said first stream to an exothermic reaction zone and said second stream to an endothermic reaction zone, passing oxygen gas containing from 50–100% free oxygen to said exothermic zone, regulating the proportion of oxygen gas added to the exothermic zone such as to form combustion products consisting essentially of carbon dioxide and water vapor, thereby liberating substantially maximum available heat of combustion, simultaneously conserving as sensible heat the thus liberated heat of combustion by continuously passing added carbon dioxide into said exothermic zone in an amount and at a temperature sufficiently low to maintain said exothermic zone at a predetermined elevated temperature in the range of about 2500–3500° F., passing directly to said endothermic reaction zone the product gas from the exothermic zone substantially at said predetermined temperature and containing substantially all of the said liberated heat of combustion, mixing said product gas therein with said second stream of gaseous hydrocarbon feed in reacting proportion for the formation of essentially hydrogen and carbon monoxide, utilizing the sensible heat of said high temperature, effluent gas from the exothermic zone to thermally support said last-named reaction, and thereby convert the reactants into a synthesis gas comprising essentially carbon monoxide and hydrogen, discharging said synthesis gas from the endothermic reaction zone and continuously maintaining the proportion of said first stream, passing to the exothermic zone, such that the total amount of C and H entering the exothermic zone is substantially the stoichiometric equivalent of oxygen entering that zone for conversion to $CO_2$ and $H_2O$ regardless of the chemical forms of the entering carbon, hydrogen and oxygen.

9. The method according to claim 8 wherein the said oxygen gas consists of substantially pure oxygen.

HARRY V. REES.
CLIFFORD G. LUDEMAN.

REFERENCES CITED

The following references are of record in the file of this patent:

UNITED STATES PATENTS

| Number | Name | Date |
|---|---|---|
| 1,904,908 | Voorhees | Apr. 18, 1933 |
| 1,954,991 | Garner | Apr. 17, 1934 |
| 1,957,743 | Wietzel et al. | May 8, 1934 |
| 1,979,820 | Bowling | Nov. 6, 1934 |
| 2,183,145 | Michael et al. | Dec. 12, 1939 |
| 2,185,989 | Roberts | Jan. 2, 1940 |
| 2,220,849 | Riblet | Nov. 5, 1940 |
| 2,243,869 | Keith | June 3, 1941 |
| 2,274,064 | Howard | Feb. 24, 1942 |
| 2,347,682 | Gunness | May 2, 1944 |
| 2,355,753 | Roberts, Jr. | Aug. 15, 1944 |
| 2,417,164 | Huber | Mar. 17, 1947 |

OTHER REFERENCES

Bone et al.: "Flame and Combustion in Gases," pages 156–157.

Houghen et al.: "Chemical Process Principles," Part One, pages 216, 262, 312, 313, 341 and 342.

Certificate of Correction

Patent No. 2,486,879                                                November 1, 1949

HARRY V. REES ET AL.

It is hereby certified that error appears in the printed specification of the above numbered patent requiring correction as follows:

Column 6, line 64, for the numeral "695.08" read *295.08*;

and that the said Letters Patent should be read with this correction therein that the same may conform to the record of the case in the Patent Office.

Signed and sealed this 18th day of April, A. D. 1950.

[SEAL]

THOMAS F. MURPHY,
*Assistant Commissioner of Patents.*